March 28, 1939.                W. SIEVERS                2,151,943
                            FRUIT OPENING MACHINE
                        Filed Sept. 22, 1936        4 Sheets-Sheet 1
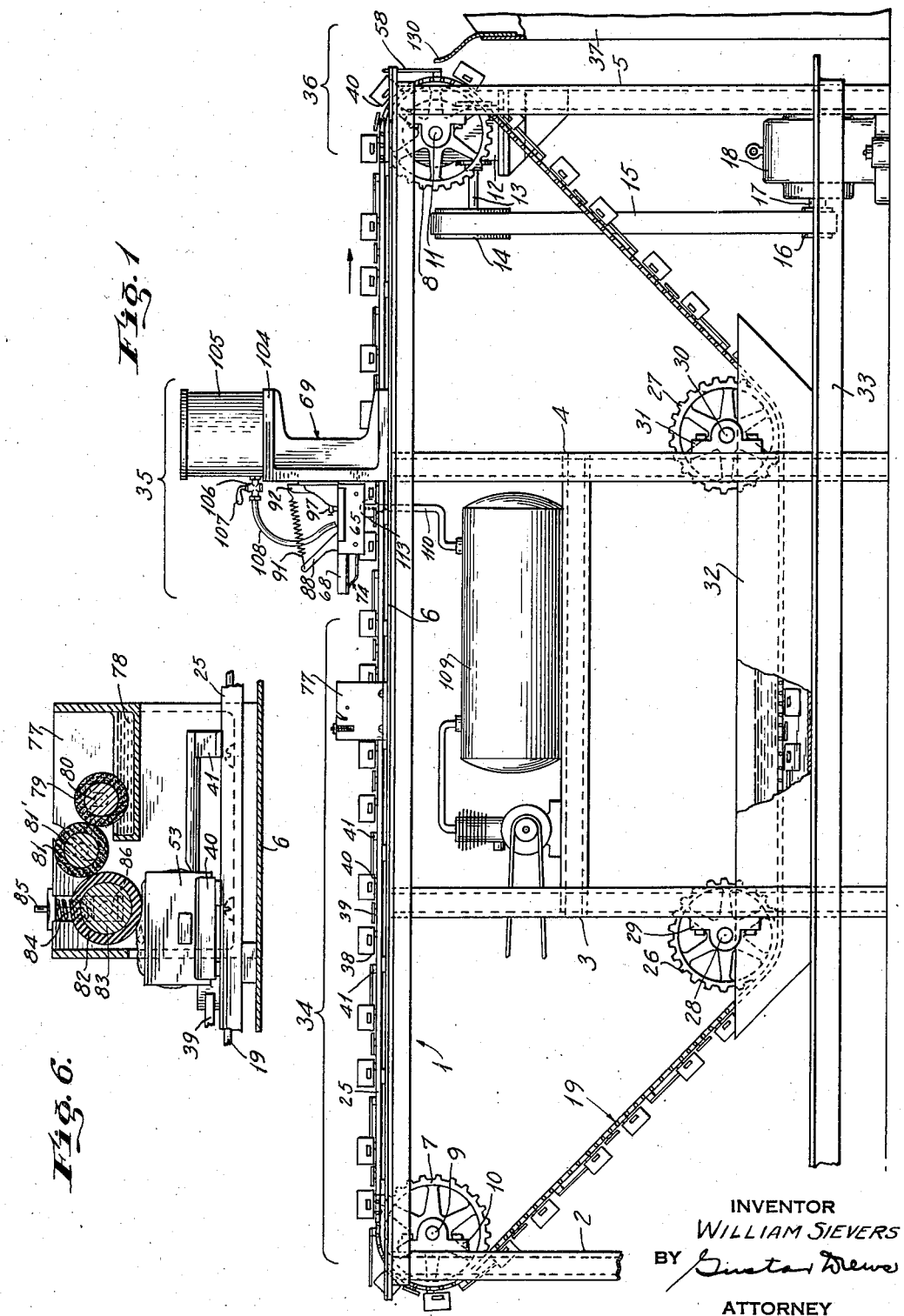
INVENTOR
WILLIAM SIEVERS
BY
ATTORNEY

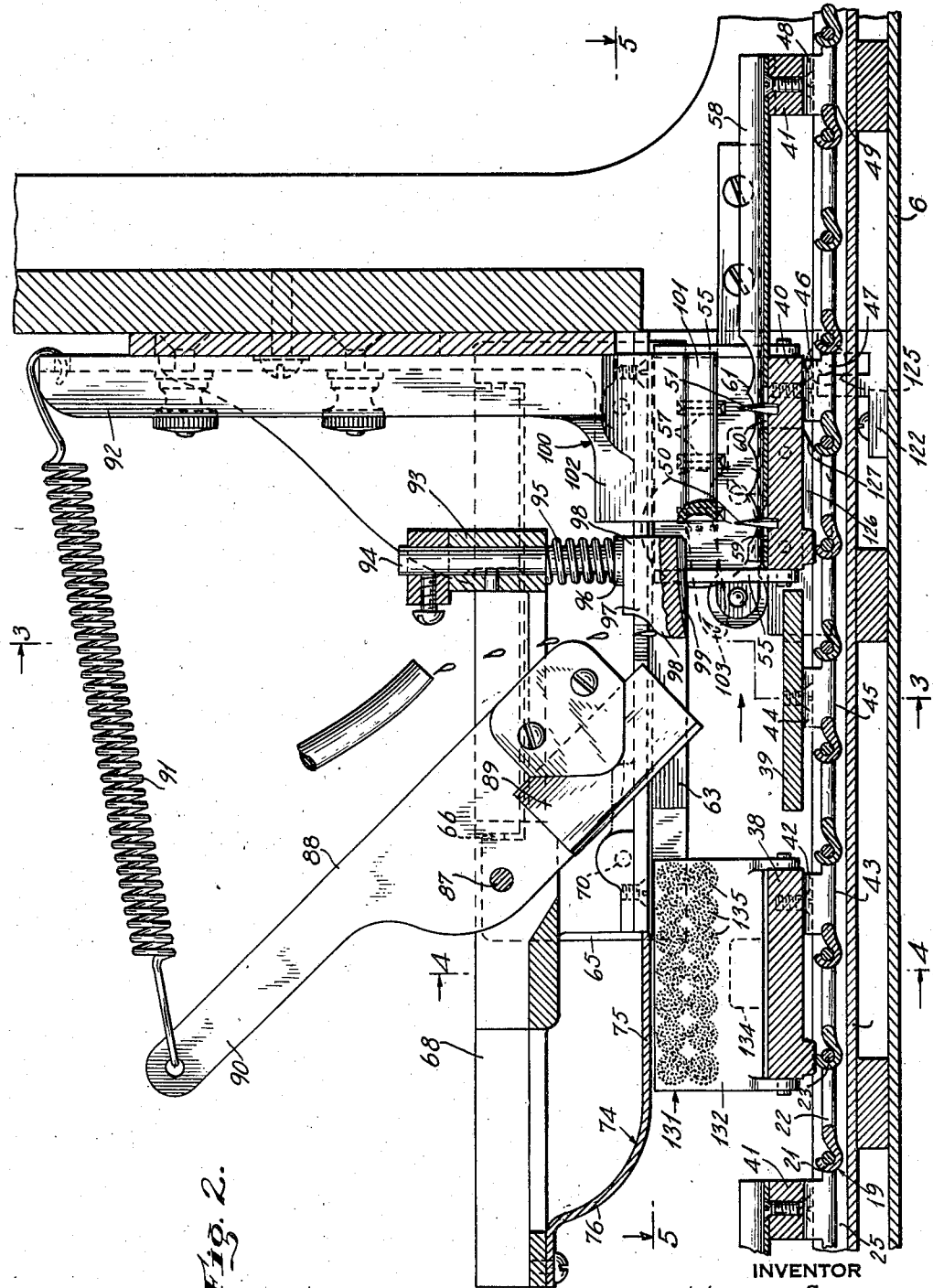

March 28, 1939.  W. SIEVERS  2,151,943
FRUIT OPENING MACHINE
Filed Sept. 22, 1936   4 Sheets-Sheet 3
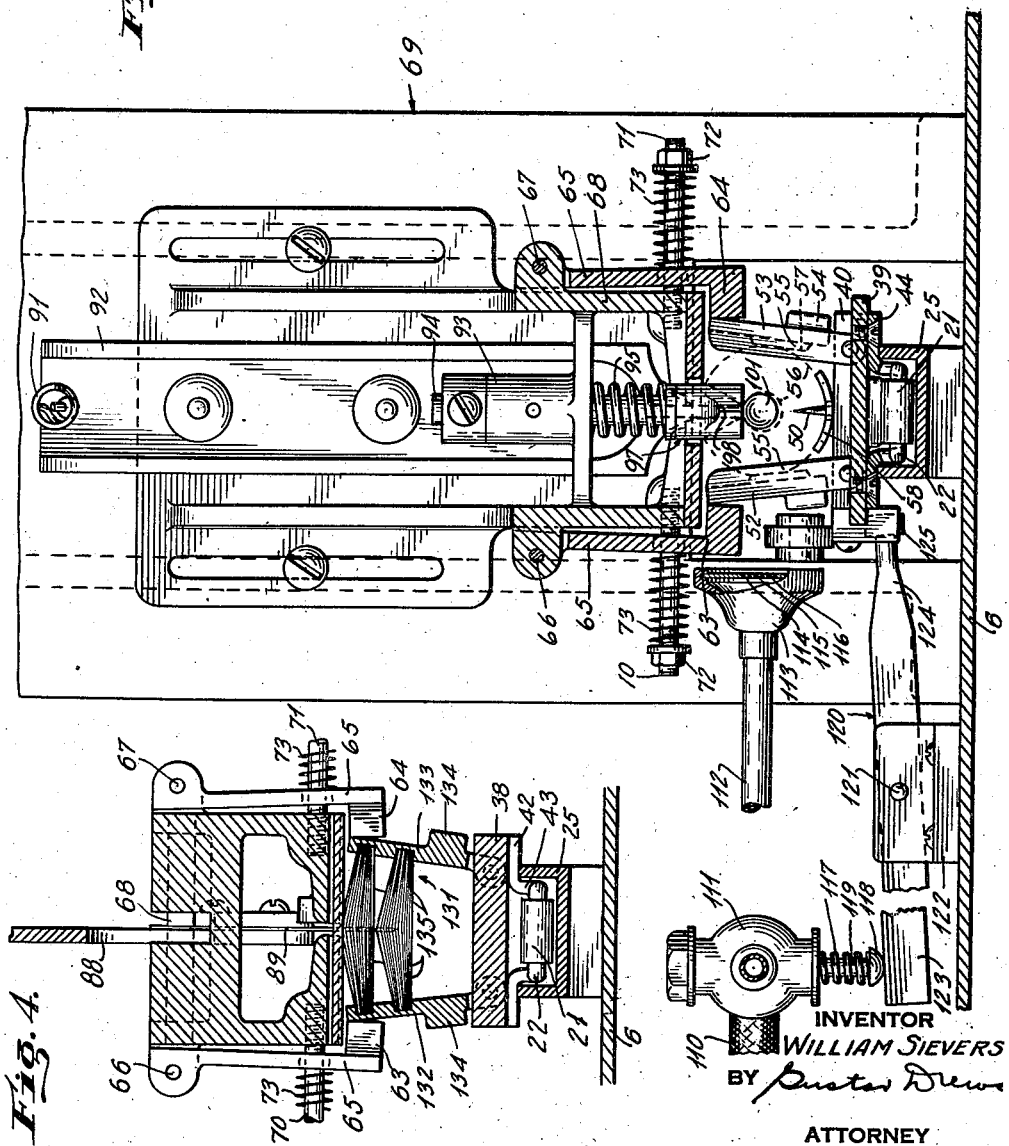
INVENTOR
WILLIAM SIEVERS
BY
ATTORNEY

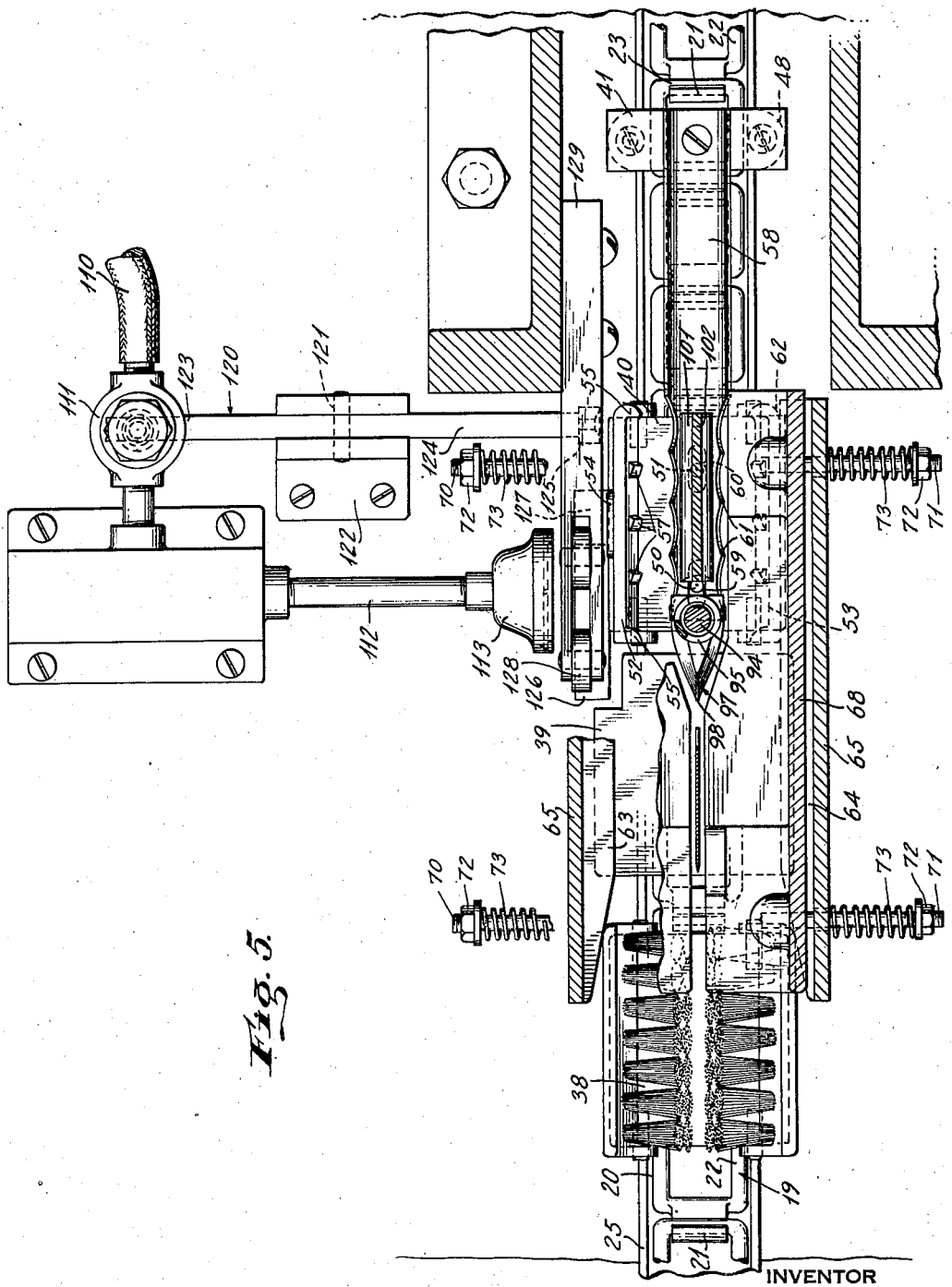

Patented Mar. 28, 1939

2,151,943

UNITED STATES PATENT OFFICE 2,151,943

FRUIT OPENING MACHINE

William Sievers, Oradell, N. J., assignor to Siecant Packing Company, Inc., New York, N. Y., a corporation of New York Application September 22, 1936, Serial No. 101,896

12 Claims. (Cl. 146—17)

This invention relates to machines for opening fruit in general and more especially to machines for opening dates and removing the pits therefrom.

Among the objects of the present invention, it is aimed to provide an improved machine for opening fruit and particularly for opening fruit containing pits and thereupon effectively removing the pits without deforming the meat of the fruit.

It is still another object of the present invention to provide an improved machine for opening fruit and particularly for opening fruit which contain pits and effectively removing the pits therefrom and at the same time maintaining the machine parts free from foreign material and the like that might adhere thereto or accumulate thereon during the process of opening and/or pitting.

These and other features, capabilities and advantages of the invention will appear from the subjoined detail description of one specific embodiment thereof illustrated in the accompanying drawings in which Figure 1 is a side elevation of a machine made according to the present invention;

Fig. 2 is an enlarged longitudinal section of one of the important parts of the machine;

Fig. 3 is an enlarged transverse section on the line 3—3 of Fig. 2;

Fig. 4 is an enlarged transverse section on the line 4—4 of Fig. 2;

Fig. 5 is an enlarged plan section on the line 5—5 of Fig. 2; and

Fig. 6 is an enlarged longitudinal section of another important part of the machine.

In the embodiment shown, there is provided a frame 1 having four pairs of standards 2, 3, 4 and 5 supporting a platform 6. At the ends of the platform 6 there are provided clearances for the sprockets 7 and 8 the sprocket 7 being mounted upon the shaft 9 journaled in the bearings 10 secured to the standards 2 and the sprocket 8 being fixed to the shaft 11 journaled in the housing 12 secured to the standards 5. The shaft 11 is pivotally connected to a train of gears in the housing not shown in turn operatively associated with the shaft 13 journaled in the housing 12. The shaft 13 has mounted thereon the pulley 14 connected by the belt 15 with the pulley 16 on the shaft 17 of the motor 18.

In the present instance, the motor 18 is either mounted on the floor or other supporting base or else connected to one of the standards 5. The sprockets 7 and 8 are provided to support the sprocket chain 19 consisting of square shaped links 20 each provided with an enlarged cylindrical hook end 21 with diminishing sides 22 and end 23 for pivotally receiving hook ends 21 of such links.

Preferably as here shown the conveyor 19 rides in the channel bar 25 mounted on the platform 6 and extending between the sprockets 7 and 8 to serve as a guide. Preferably also as here shown there are provided two additional sprockets 26 and 27 the sprocket 26 being mounted on the shaft 28 journaled in the bearings 29 secured to the standards 3 near their lower ends and the sprocket 27 being mounted on the shaft 30 journaled in the bearings 31 secured to the standards 4 near their lower ends, the sprockets 26 and 27 likewise engaging the bars 21 of the links 20 to guide the conveyor 19 through the bath contained in the pan or trough 32. The trough 32 is preferably partially filled with either plain water cleaning solution or the like to wash and clean the conveyor 19 and the parts associated therewith and in some cases merely to moisten the conveyor and parts associated therewith depending upon the fruit to be pitted.

It will be noted also that the standards 2, 3, 4 and 5 are preferably braced by the side bars 33.

The fruit to be opened and/or pitted passes primarily through three main stations the first station in the area generally designated as 34, the second station in the area generally designated as 35 and the third station in the area generally designated as 36. At the first station, the fruit to be opened and/or pitted is placed onto the conveyor 19. At the second station the fruit is opened and/or pitted and at the third station the opened and/or pitted fruit is removed from the conveyor 19 and fed or dispatched into the hopper 37. The conveyor 19 on the other hand not only passes through the aforesaid three stations but in addition passes through a fourth station, to wit through the bath contained in the trough 32. Aside from the foregoing, at the station 35, certain parts mounted upon the conveyor 19 cooperate to clean certain of the treating devices located at the station 35.

To facilitate an understanding of the invention, the parts associated with treating the fruit, as distinguished from cleaning or treating the machine parts will first be described.

In the present instance, the conveyor 19 is provided with a plurality of successive sets of devices constituting a pitch of the machine. In Fig. 2, a length of the conveyor 19 corresponding to such a pitch is shown including the bracket 38, platform 39, base 40 and extension 41. The bracket 38 has connecting webs 42 extending from the arms of the link 43. Preferably the platform 39 is connected by the connecting webs 44 to the arms of the link 45 spaced from the link 43 by an intervening link. The base 40 in the present instance is connected by the connecting webs 46 to the link 47 spaced from the link 45 by two intervening links and the extension 41 is connected by the connecting webs 48 to the link 49 spaced from the link 47 by two intervening links. The description of the bracket 38 and associated parts relating to the treatment of the machine parts will be deferred as aforesaid.

The platform 39, base 40 and extension 41 on the other hand relating directly to the fruit treating elements will now be discussed.

The platform 39 serves merely as a temporary resting place for the pit after it has been removed from the fruit and extends to the rear end of the base 40 which constitutes the base or bottom support for the fruit. In the present instance, this base has extending upwardly therefrom a plurality of fruit holding devices, two spurs 50 and 51 being ordinarily sufficient. As shown in Fig. 3, the base 40 has pivotally connected to its end the side walls 52, 53. These side walls 52, 53 preferably have stops 54 extending from their outside faces to cooperate with the upper level of the base 40 and thus limit the outward movement of the side walls 52 and 53. The rear ends of the side walls 52 and 53 are further provided with inwardly extending flanges 55 to cooperate with the spurs 50 and 51 to anchor the fruit 56 to be opened on the base 40 and between the side walls 52, 53. To further cooperate with the spurs 50 and 51 and the flanges 55, the inner faces of the side walls 52, 53 are each provided with a plurality of ridges 57 extending transverse to the length of the side walls.

The extension 41 has a long finger 58 preferably concave in transverse section as shown in Fig. 3. This finger 58 extends from the extension 41 back to and the full length of the base 40 being provided with two openings 59 and 60 to clear the spurs 50 and 51 when the finger 58 rests on the base 40 as shown in Fig. 2. The lateral edges of the finger 58 in alinement with the base 40 are shaped to form a plurality of projections 61 similarly to cooperate with the spurs 50, 51, the flanges 55 and ridges 57 to anchor the fruit 56 on the base 40 while being opened and/or pitted.

The side walls 52, 53 have their advance outer edges 62 inclined to cooperate with the inwardly projecting portions 63, 64 of the wings 65 pivotally connected at 66 and 67 respectively on the extension 68 of the bracket 69 secured to the platform 6 and bridging the conveyor 19 and channel bar 25. The extension 68 is provided with four outwardly extending screws 70 and 71 which extend through openings in the wings 65. The outer ends of the screws 70 and 71 are preferably provided with nuts or the like abutments 72 between which and the outer faces of the wings 65, there are tensed the springs 73 to resiliently maintain the wings 65 against the outer faces of the extension 68. When the base 40 and side walls 52, 53 constituting a fruit holder approach the extension 68 so that the advance edges 62 of the side walls 52, 53 engage the inclined advance faces of the projections 63, 64, the springs 73 acting on the wings 65 will tend to press the side walls 52 and 53 toward one another to center and clamp the fruit 56.

To the rear of the wings 65, the extension 68 is provided with a plate 74 having a portion 75 extending parallel to the upper face or upper edges of the side walls 52 and 53 and a rear convex curved portion 76 to act as a cam face to cam the fruit down into position on the spurs 50, 51.

In some instances, as shown in Figs. 1 and 6 there is provided to the rear of the extension 68, two supporting walls 77 extending upwardly alongside of and parallel to the channel bar 25 to support a trough 78 above the path of movement of the fruit containing water or the like into which extends a portion of a roller, such as the rubber roller 79 mounted on the shaft 80 journaled in the walls 77, which roller 79 preferably composed of sponge rubber or the like is provided to transfer moisture to the roller 81 mounted on the shaft 81' journaled in the walls 77, which roller 81 in turn is composed of a water absorbing substance, such as sponge rubber, in turn to transfer the moisture to the pressure roller 82 mounted on the shaft 83 journaled in the walls 77. The roller 82 similarly is preferably composed of some suitable moisture absorbing material, as for instance sponge rubber but of sufficient rigidity when encountering the upper surface of a fruit unit 56 to initially impart a downward pressure on the fruit unit into fixed position with the spurs 50, 51. To cooperate with the shaft 83 of the roller 82 to maintain the roller 82 in yieldable relation to the fruit and yet effect a downward yieldable pressure, there are provided the compression springs 84 mounted upon the pins 85 and engaging the upper faces of the journals 86 of the shaft 83.

Journaled in the extension 68 is the shaft 87 of the knife support 88 having mounted thereon the knife blade 9 of the wafer knife blade type. The support 88 has an arm portion 90 connected by the spring 91 to the upper end of the arm 92 secured to the main bracket 69. The rightangular front edge of the blade 89 is normally maintained in the path of the fruit unit 56 as shown in Fig. 2 between the rear portion of the wings 65. To the front of the knife support 88, there is provided the pit centering bracket 93 having the vertically extending stem 94 provided with a compression spring 95 between the bracket 93 and the abutment 96 formed on the upper end of the shoe 97. The shoe 97 has a rear tapered end 98 and a lower concave face 99 terminating at its rear end in a tapered point. The lower side of the shoe 97 preferably extends down below the lower level of the plate portion 75 and in alinement according to the fruit to be pitted with the upper surface of the pit after the fruit has been opened by the knife blade 89.

In front of the shoe 97, there is provided the pitting bracket 100 terminating at its lower longitudinal end in the cylindrical horn 101 extending parallel to the path of movement of the fruit unit 56 and connected to the web 102 extending the full length of the horn 101 to the lower end of the arm 92. The rear end of the horn 101 is concave and preferably conformed to the type of pit to be removed to engage the front or advance end of the pit, as for instance the pit 103 and hold it against advancement with the conveyor 19 and base 40. As shown, the horn 101 is disposed below the level of the lower face of the shoe 97 and parallel to the path of movement of the conveyor 19 and in alinement with the pit to be removed, as for instance the pit 103.

The web 102 extends the full length of the horn 101 to serve as a possible supplemental pit remover. As an instance, if the pit should not be properly positioned to be engaged by the rear end of the horn 101, especially if positioned above the horn 101, the web 102 would be in position to engage such pit and eject it. It is of course understood that the web 102 would otherwise merely follow along the incision made by the knife 89.

The bracket 69 is preferably provided with a platform 104 to support the reservoir 105 containing water or the like liquid having a nozzle or outlet 106, controlled by the valve handle 107 preferably to permit the passage of a slow drip of liquid through the conduit 108 onto the fruit unit 56 after it has been opened by the knife 89.

The operation of the machine so far described is substantially as follows:

On the platform 6 at the station 34, there are distributed the fruit units, such as dates to be opened and/or pitted, operators are positioned around this area or station 34 and place the units 56 onto the bases 40 of the fruit holders, preferably with sufficient pressure to impale them on the spurs 50 and 51. Thereupon, in the course of movement, the fruit units 56 will first be engaged by the roller 82 further to press the units into place on the spurs 50 and 51, whereupon the cam plate 74 will engage the units finally to press them into place, thereupon the side walls 52 and 53 will be urged inwardly by the wings 65 to center the fruit, whereupon the knife 89 will cut the fruit unit the full length thereof above the pit, thereupon the tapered point of the shoe 97 will enter the fruit unit and engage the pit 103 to center it for engagement by the horn 101 when the pit 103 will be arrested while the conveyor 19 and fruit unit 56 continue on their way until the pit is suspended above the platform 39.

The platform 39 serves mainly as a protection to prevent the pit thereupon to drop onto the conveyor 19 and clog up the machine. In order to dispatch the pit 103 to one side and normally without first dropping onto the platform 39, there is provided the pneumatic device now to be described.

As shown, there is here provided an air pressure reservoir 109 supplied with pressure by a pump or the like in the conventional way. This air pressure reservoir is connected by the conduit 110 with the valve in the chamber 111 in turn to control the passage through the conduit 112 to the discharge nozzle 113. The discharge nozzle 113 preferably has a plurality of discharge outlets 114, 115 and 116 as shown, positioned to direct a plurality of jets of air under pressure in the area 35 between the front end of the shoe 97 and the rear end of the horn 101 so that as soon as the pit 103 emerges from between the side walls 52, 53, the air pressure will act on the same to cooperate with the horn 101 to free the pit 103 and finally to eject it to one side of the conveyor 19 preferably into a hopper or the like not shown.

The valve 111 is normally closed due to the compression of the spring 117 exercising an outward pressure on the head 118 of the stem 119 of the valve into closed position. To open the valve in the chamber 111, it will only be necessary to press the stem 119 upward against the tension of the spring 117. This is accomplished by the lever 120 pivotally mounted at 121 in the bracket 122 mounted on the platform 6. One arm 123 of which lever 120 engages the lower end end of the head 118 and the other arm 124 of which is provided with a roller 125 to engage the cam 126, first engaging the inclined face 127 of the cam 126 gradually to open the valve. In order to steady the base 40 when so engaged by the cam 126, there are provided the rollers 128 mounted on the stub shaft 129 extending inwardly from the bracket 69. The cam 126 as shown in Fig. 2 is secured to the side of the base 40 beginning approximately at the middle thereof and extending back to and beyond the front end of the platform 39.

From the foregoing, it will therefore appear that the air blast from the nozzle 113 will begin immediately that the pit 103 begins to emerge from between the rear ends of the side walls 52 and 53 and continue the full length of the pit 103 as it leaves the rear ends of the side walls 52 and 53.

Thereupon and when the base 40 moved into the area 36 and the link 49 engages the sprocket 8, it will swing the link 49 and in turn swing the finger 58 out of the cup or fruit holder formed by the base 40, and side walls 52 and 53 clearing the spurs 50 and 51 in turn to remove the fruit unit 56 from the spurs 50 and 51 and dispatch or eject the fruit unit 56 into the hopper 37. While ordinarily the finger 58 will effectively eject the fruit unit 56 into the hopper 37, should the fruit unit cling to the finger 58, due to its possibly sticky composition, the lip 130 in the path of movement of the fruit unit 56 will engage the same to wipe it off the finger 58. It will of course be apparent that as soon as the side walls 52 and 53 clear the wings 65, they will again be free to swing out and thereby sufficiently free the fruit unit to enable the finger 58 readily to eject it from the base 40. The machine treating features of the invention will now be described.

After a fruit unit 56 has been discharged, the several parts constituting the pitch of the machine will of course be free to receive another fruit unit. Therefore, in order to remove any foreign material that might have been deposited or adhered to the conveyor 19, platform 39, base 40, finger 58 and associated parts during the previous operation, these several parts will now pass through the bath in the trough 32.

Furthermore, to remove any foreign material that might adhere to the blade 89, shoe 97 and horn 101, the brushes 131 now to be described are provided.

For this purpose, there is provided a brush supporting bracket 38 in each pitch of the machine. To each of these brackets 38, there are pivotally connected a pair of brush supporting side walls 132 and 133. These brush supporting side walls 132 and 133 each have on their own outer faces a stop lug 134 to cooperate with the upper face of the bracket 38 and thus limit the outward swing of the side walls 132 and 133. Secured to these side walls and extending inwardly therefrom, there are provided a plurality of tufts or bristles or the like 135 constituting the brushes 131. These bristles 135 are slightly inclined upward to facilitate the operation now to be described. The front edges of the side walls also are inclined to cooperate with the rear edges of the wings 65 so that when the brackets 38 are carried along with the conveyor 19 to the wings 65, the side walls 132 and 133 will be urged toward one another, so that the edges of the bristles, see Fig. 4 will effectively engage and clean first the knife blade 89, next the shoe 97 and finally the horn 101 in succession.

It is obvious that various changes and modifications may be made to the details of construction without departing from the general spirit of the invention as set forth in the appended claims.

I claim:

1. The combination of a frame, a conveyor mounted to travel across said frame, a fruit carrier secured to said conveyor, a fruit treating device mounted on said frame in the path of movement of the fruit carried by said carrier, and brush elements connected to said conveyor and arranged in pairs extending toward one another and transversely of said coveyor to engage and thereby to clean the fruit treating device after the fruit has been treated, said brush elements being pivotally connected to the conveyor, and cams on said frame for operating said brushes simultaneously to clamp between them and thereby clean opposite sides of said fruit treating device.

2. The combination of a frame, a conveyor mounted to travel across said frame, a fruit carrier secured to said conveyor; a fruit treating device including a knife, a pit centering element, and a pit arrestor for removing the pit from the fruit, all mounted on said frame; the knife being positioned to slit the fruit, the pit centering element positioned thereupon to center the pit, the pit arrestor positioned to arrest the pit while the carrier with the fruit continues on its way; a bracket connected to said conveyor following said carrier; and brush elements mounted on said bracket and extending toward one another and transversely of said bracket to engage said knife, pit centering element and pit arrestor to clean the same after having treated the fruit, said brush elements being pivotally connected to the conveyor, and cams on said frame for operating said brushes simultaneously to clamp between them and thereby clean opposite sides of said fruit treating device.

3. The combination of a frame, a conveyor mounted to travel across said frame, a fruit carrier secured to said conveyor; a fruit treating device including a knife, a pit centering element, and a pit arrestor for removing the pit from the fruit, all mounted on said frame; the knife being positioned to slit the fruit, the pit centering element positioned thereupon to center the pit, the pit arrestor positioned to arrest the pit while the carrier with the fruit continues on its way; a bracket connected to said conveyor following said carrier; side walls pivotally connected to said bracket; brush elements extending inwardly toward one another from said side walls; and deflectors mounted on said frame adjacent to said fruit treating device to deflect said side walls toward one another and thereby said brushes into cleaning engagement with said knife, pit centering element and pit arrestor.

4. The combination of a frame, rotors at the ends of said frame, an endless conveyor drivingly connected to said rotors to travel across said frame, a fruit carrying base connected to and parallel to said conveyor, two spurs extending upwardly from said base to receive the fruit and maintain its outer surface free for treatment, fruit compressing elements mounted on said frame to engage the outer surface of the fruit and securely impale the fruit on said spurs, a fruit treating device mounted on said frame for treating the fruit while so held by said spurs, a fruit ejector mounted on another part of said conveyor including a finger extending back into engagement with, and overlying, the upper face of said base and cooperating with one of said rotors for deflecting said finger away from said base thereby to eject the fruit after treatment by said fruit treating device.

5. The combination of a frame, a rotor, a flexible conveyor drivingly connected to said rotor to travel across said frame, a fruit carrying base connected to said conveyor, two spurs extending upwardly from said base to receive the fruit, fruit compressing elements mounted on said frame to engage and securely impale the fruit on said spurs, a fruit treating device mounted on said frame for treating the fruit while so held by said spurs, and a fruit ejector mounted on said conveyor including a concave finger having openings therein to clear said spurs and normally extending back into alinement with the upper face of said base and cooperating with said rotor for deflecting said finger away from said base thereby to eject the fruit after treatment by said fruit treating device.

6. The combination of a frame, a guide, a conveyor mounted to travel across said frame and around said guide, a fruit carrying base connected to said conveyor, two spurs extending upwardly from said base to receive the fruit, fruit compressing elements mounted on said frame to engage and securely impale the fruit on said spurs, a fruit treating device mounted on said frame for treating the fruit while so held by said spurs, a fruit ejector mounted on and travelling with said conveyor including a finger extending back into alinement with the upper face of said base and cooperating with said guide for deflecting said finger away from said base thereby to eject the fruit after treatment by said fruit treating device, and a fixed lip extending into the path of movement of the fruit on said finger when deflected to insure ejection of the fruit therefrom.

7. The combination of a frame, an endless conveyor, guides for guiding said conveyor across said frame and then around the ends of said frame down under said frame, a fruit carrier connected to said conveyor including spurs extending outwardly away from said conveyor to support the fruit with its outer surface free for treatment, a fruit treating device mounted on said frame including elements for treating the fruit, a fruit ejector connected to said conveyor, and means for actuating said conveyor and thereby its fruit carrier to transport the fruit into fruit treating engagement with the elements of said fruit treating device and for actuating said fruit ejector around one end of said frame to deflect the same in turn to eject the fruit, said fruit ejector including a rearwardly extending arm normally in engagement with, and overlying, the upper face of said carrier and projecting outwardly therefrom when the conveyor moves around one of said guides thereby to deflect the fruit outwardly from said conveyor.

8. The combination of a frame, an endless conveyor, guides for guiding said conveyor across said frame and then around the ends of said frame down under said frame, a fruit carrier connected to said conveyor including spurs extending outwardly away from said conveyor to support the fruit with its outer surface free for treatment, a fruit treating device mounted on said frame including elements for treating the fruit, a fruit ejector connected to said conveyor, means for actuating said conveyor and thereby its fruit carrier to transport the fruit into fruit treating engagement with the elements of said fruit treating device and for actuating said fruit ejector around one end of said frame to deflect the same in turn to eject the fruit, and a lip at said latter end of said frame extending into the path of movement of the fruit on said finger when deflected to insure ejection of the fruit therefrom, said fruit ejector including a rearwardly extending arm normally in engagement with, and overlying, the upper face of said carrier and projecting outwardly therefrom when the conveyor moves around one of said guides thereby to deflect the fruit outwardly from said conveyor.

9. The combination of a frame, an endless sprocket chain, sprockets at the ends of said frame for guiding the chain across said frame and then around the ends of said frame down under said frame, a fruit carrier having a base connected to said conveyor including spurs extending outwardly away from said conveyor to support the fruit with its outer surface free for treatment, a fruit treating device mounted on said frame including elements for treating fruit, a fruit ejector secured to said chain and including a finger extending back into engagement with, but not attached to, the base of said carrier and the bottom of the fruit carried thereby, and means for actuating one of said sprockets in turn to actuate said conveyor and thereby its fruit carrier to transport the fruit into fruit treating engagement with the elements of said fruit treating device and for actuating said fruit ejector around one of said sprockets thereby to deflect said finger and in turn to eject the fruit from said carrier.

10. The combination of a frame and a bath beneath said frame, an endless sprocket chain, sprockets at the ends of said frame for guiding the chain across said frame and below said frame and at the ends of said bath for guiding the chain down into, and up out of, said bath, a fruit treating device mounted on said frame including elements for opening the fruit and removing the pit, a plurality of successive machine pitch constituting devices connected to said conveyor, each pitch including successively a cleaning element, a pit receiving platform, and a fruit carrier; a fruit ejector, a pit ejecting pneumatic device operatively associated with said frame comprising a nozzle and a control valve positioned adjacent to said fruit treating device and to one side of the path of movement of said chain, the nozzle positioned closely adjacent to the path of movement of said pit receiving platforms and effective to direct a blast of air substantially horizontally and transversely across said pit receiving platforms, said pneumatic device thereby positively removing the ejected pit from the path of the succeeding fruit carriers, and means for actuating one of said sprockets in turn to actuate said conveyor and its succession of pitches successively to transport the fruit and cleaning element into engagement with the elements of said fruit treating device for actuating said valve to effect actuation of said pit ejecting device and for actuating said fruit ejector around one of said sprockets thereby to deflect said fruit ejector in turn to eject the fruit from said carrier, said platform protecting the conveyor and associated parts from accidental deposits of removed pits or fruit particles.

11. The combination of a frame, a fruit carrier, means for securing the fruit to said carrier, a conveyor to which said carrier is connected, a guide on said frame for said conveyor, means for advancing said conveyor across said frame, a knife, a bracket mounted on said frame and supported resiliently to maintain said knife in the path of movement of the fruit carried by said frame to slit the same, a pit arrestor mounted on said frame to arrest the pit of the fruit after the fruit has been slit without releasing the fruit from said carrier, a nozzle mounted on said frame to one side of the path of movement of said conveyor and closely adjacent the rear of the pit arrestor to direct a blast of air substantially horizontal and transverse to such path of movement at the pit while it is being, and after it has been, removed by said arrestor to dispatch the same to one side to clear the path for the successive fruit carriers and without releasing the fruit so carried, and means for supplying air under pressure to said nozzle.

12. The combination of a frame, a fruit carrier, means for securing the fruit to said carrier, a conveyor to which said carrier is connected, a guide on said frame for said conveyor, means for advancing said conveyor across said frame, a knife, a bracket mounted on said frame and supported resiliently to maintain said knife in the path of movement of the fruit carried by said frame to slit the same, a pit arrestor mounted on said frame to arrest the pit of the fruit after the fruit has been slit without releasing the fruit from said carrier, a nozzle mounted on said frame to one side of the path of movement of said conveyor and closely adjacent the rear of the pit arrestor to direct a blast of air substantially horizontal and transverse to such path of movement at the pit while it is being, and after it has been, removed by said arrestor to dispatch the same to one side to clear the path for the successive fruit carriers and without releasing the fruit so carried, an air supply, a conduit for connecting said supply to said nozzle, a valve in said conduit, a lever for controlling said valve, and a cam associated with said carrier to actuate said lever when said carrier alines with said nozzle to open said valve to liberate a blast of air under pressure at the pit as aforesaid.

WILLIAM SIEVERS.